(12) United States Patent
Burlatsky et al.

(10) Patent No.: US 7,153,343 B2
(45) Date of Patent: Dec. 26, 2006

(54) FUEL DEOXYGENATION SYSTEM

(75) Inventors: Sergei F. Burlatsky, Vernon, CT (US);
Mallika Gummalla, Longmeadow, MA (US); Louis J. Spadaccini, Manchester, CT (US); Foster Philip Lamm, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 388 days.

(21) Appl. No.: 10/808,151

(22) Filed: Mar. 24, 2004

(65) Prior Publication Data

US 2005/0211096 A1    Sep. 29, 2005

(51) Int. Cl.
*B01D 19/00* (2006.01)
*B01D 53/22* (2006.01)

(52) U.S. Cl. .................. 95/46; 95/54; 95/265; 96/6
(58) Field of Classification Search .............. 95/46, 95/54, 263, 265; 96/6, 219
See application file for complete search history.

(56) References Cited

U.S. PATENT DOCUMENTS

| | | | |
|---|---|---|---|
| 4,729,773 A | 3/1988 | Shirato et al. | |
| 5,619,855 A | 4/1997 | Burrus | |
| 5,888,275 A | 3/1999 | Hamasaki et al. | |
| 6,253,554 B1 | 7/2001 | Kobayashi et al. | |
| 6,315,815 B1 | 11/2001 | Spadaccini et al. | |
| 6,672,072 B1 | 1/2004 | Giffin, III | |
| 6,709,492 B1 * | 3/2004 | Spadaccini et al. | 96/6 |
| 6,939,392 B1 | 9/2005 | Huang et al. | |
| 7,041,154 B1 * | 5/2006 | Staroselsky et al. | 95/30 |

OTHER PUBLICATIONS

European Search Report, dated Jul. 7, 2005.

* cited by examiner

*Primary Examiner*—Robert A. Hopkins
(74) *Attorney, Agent, or Firm*—Carlson, Gaskey & Olds

(57) ABSTRACT

A fuel system for an energy conversion device includes a deoxygenator system with a porous membrane. The deoxygenator includes an oxygen receiving channel separated from the fuel channel by the porous membrane. The capillary forces counteract the pressure differential across the membrane, preventing any leakage of the fuel, while the oxygen concentration differential across the membrane allows for deoxygenation of the fuel through the porous membrane.

24 Claims, 4 Drawing Sheets

FUEL DEOXYGENATION SYSTEM

BACKGROUND OF THE INVENTION

The present invention relates to stabilizing fuel by deoxygenation, and more particularly to deoxygenation through a self-supporting porous membrane adjacent an oxygen receiving channel.

Jet fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to 2 ppm is sufficient to overcome the coking problem.

One conventional Fuel Stabilization Unit (FSU) utilized in aircraft removes oxygen from jet fuel by producing an oxygen pressure gradient across a membrane permeable to oxygen. Although quite effective, the gradient is produced by vacuum on one side of the membrane. As the vacuum also introduces mechanical forces on the membrane, the membrane is supported on a porous stainless steel backing plate, which is relatively expensive to manufacture and may be a diffusion barrier requiring a relative increase in the FSU size. The membrane is relatively thin (~2–5 microns) and lacks mechanical integrity, hence the porous backing. Mechanical pumps and vacuum housings are also required to generate the pressure gradient which further increases the size and weight of the FSU.

Such thin membranes (2–5 microns) may have defects and pin-holes. Fuel may then seep through the membrane and accumulating in the backing which results in further resistance to deoxygenation.

Accordingly, it is desirable to provide a method and system for the deoxygenation of hydrocarbon fuel in an inexpensive, size and weight efficient system that avoids the relatively heavy machinery required to produce a vacuum across a relatively thin membrane.

SUMMARY OF THE INVENTION

The fuel system for an energy conversion device according to the present invention includes a deoxygenator system with a self-supporting porous membrane. A sweep gas and/or vacuum maintains an oxygen concentration differential across the membrane to deoxygenate the fuel.

In another system, a fuel condenser is incorporated down stream of a nitrogen bleed to recover any fuel carried away by the sweep gas.

In another system, oxygen is removed in multiple stages which operates at sequentially elevated fuel temperatures as the fuel is utilized as a coolant for a multiple of heat exchange subsystems.

The present invention therefore provides a method and system for the deoxygenation of hydrocarbon fuel in an inexpensive, size and weight efficient system that avoids the relatively heavy machinery required to produce a vacuum across a relatively thin membrane.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
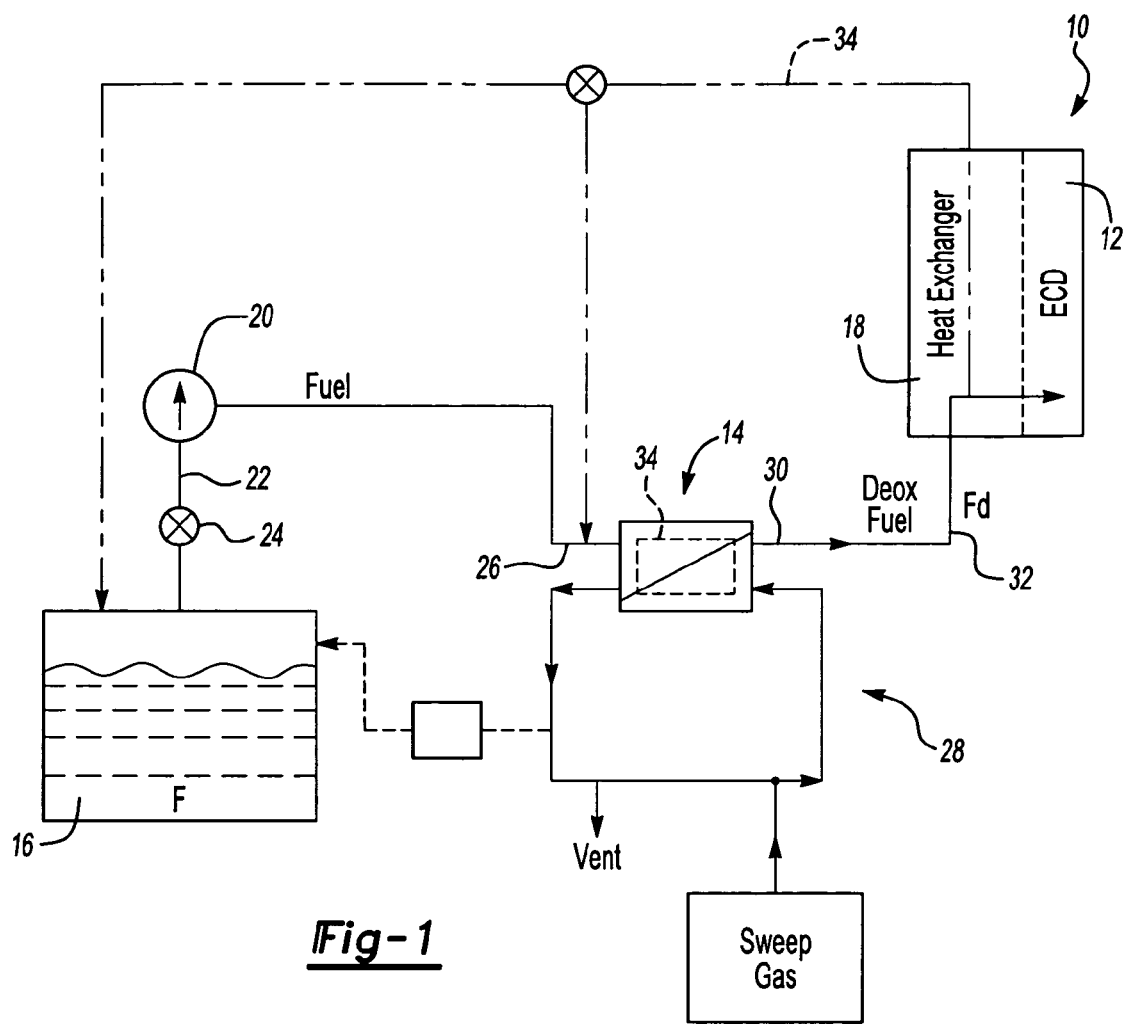
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16. The fuel F is typically a hydrocarbon such as jet fuel. The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

One form of the ECD 12 is a gas turbine engine, and particularly such engines in high performance aircraft. Typically, the fuel also serves as a coolant for one or more sub-systems in the aircraft, and in any event becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by pump 20 assists in circulating the fuel F through the deoxygenator system 14 and other portions of the fuel system 10. As the fuel F passes through the deoxygenator system 14, oxygen is selectively removed into a sweep gas system 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 34 to either the deoxygenation system 14 and/or the reservoir 16. It should be understood that although a particular component arrangement is disclosed in the illustrated embodiment, other arrangements will benefit from the instant invention.

Figure 2:
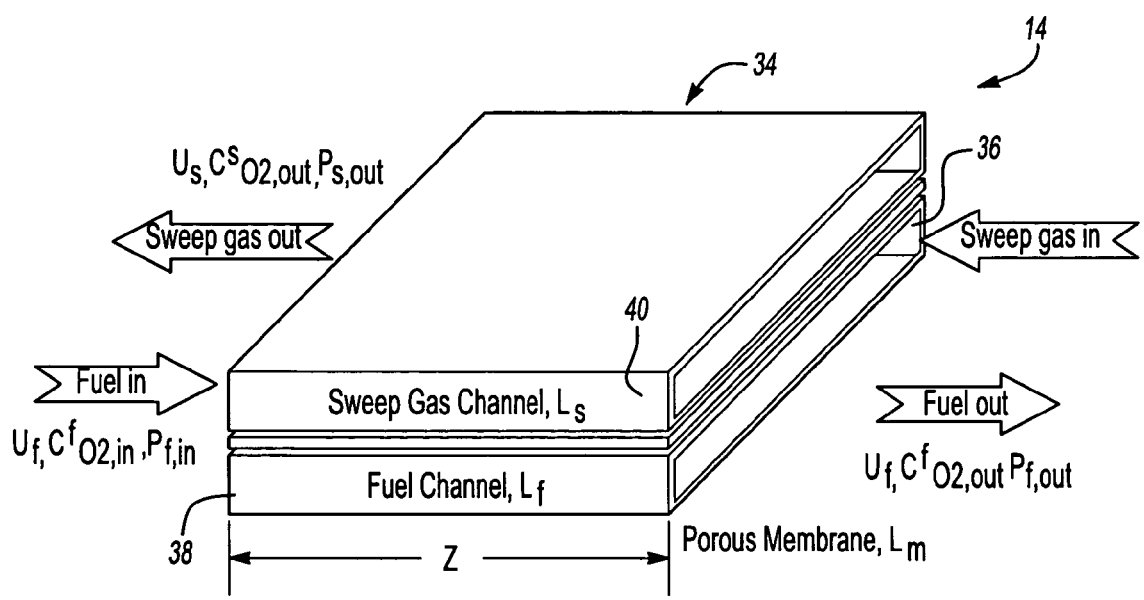
FIG. 2 is a block view of the deoxygenator system.

Referring to FIG. 2, the deoxygenator system 14 preferably includes a gas/fuel contractor 34 with a self-supporting Oxygen permeable porous membrane 36 between a fuel channel 38 and an oxygen receiving channel such as a sweep gas channel 40. The sweep gas channel 40 preferably contains nitrogen and/or another inert gas. It should be understood that the channels may be of various shapes and arrangements to provide a pressure differential, which maintains an oxygen concentration differential across the membrane to deoxygenate the fuel. The fuel and the sweep gas preferably flow in opposite directions. Here, U is the velocity, $CO_{O2}$ is the Oxygen concentration in the fuel, L is the thickness of the channel/layer, Z is the length of the channel and P is the pressure. The subscripts or superscripts, s refers to sweep gas, f to the fuel, in to flow inlet, out to the flow outlet, and m to the membrane 36.

Figure 3:
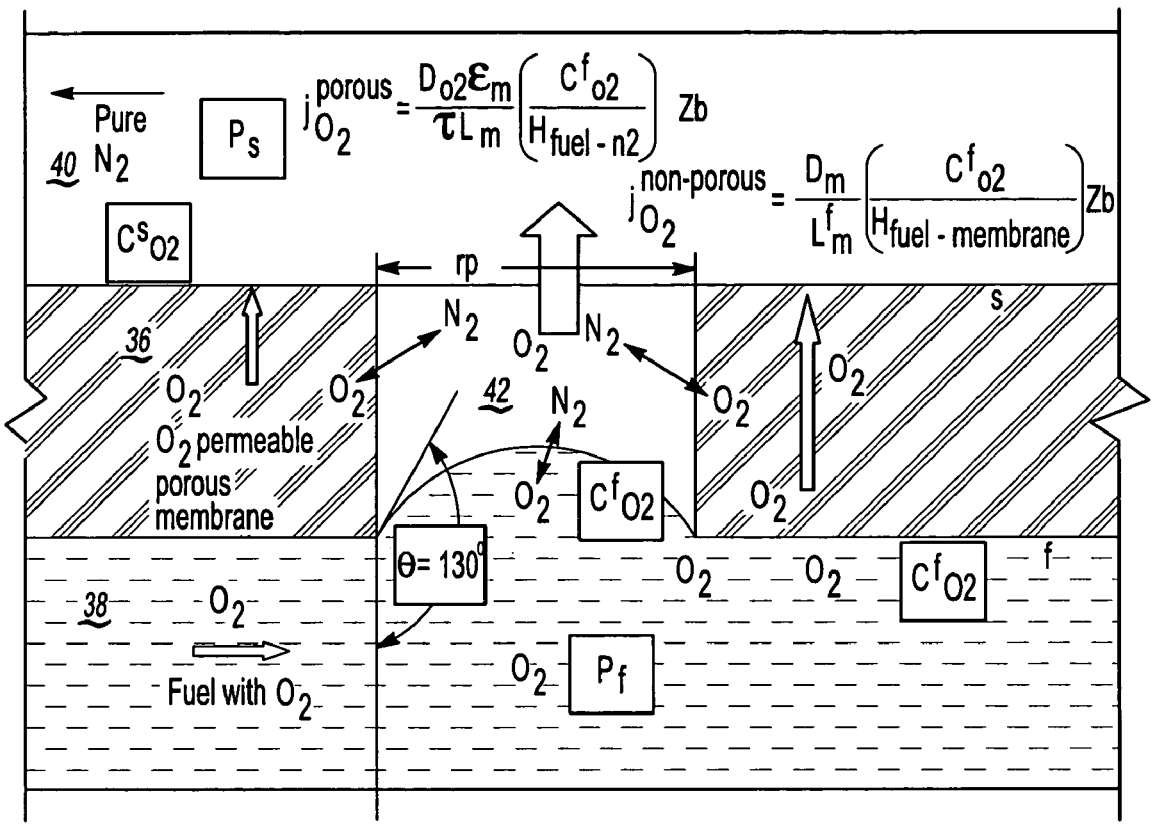
FIG. 3 is an expanded view of a self-supporting Oxygen permeable porous membrane between a fuel channel and a sweep gas channel block diagram of a deoxygenator system of the present invention.

The movement of the sweep gas (e.g. $N_2$) within the sweep gas channel 40 maintains a concentration differential across the membrane 36 (FIG. 3). The flux of oxygen through the membrane is proportional to the diffusivity of oxygen in the sweep gas, and is given as $$j_{O_2}^{porous} = \frac{D_{O2}\varepsilon_m}{\tau L_m}\left(\frac{C_{O2}^f}{H_{fuel-N2}}\right)Zb. \quad (1)$$

$D_{O2}$ is the diffusion coefficient of oxygen in the sweep gas, $C_{O2}$ is the Oxygen concentration, $L_m$ is the thickness of the porous membrane, Z is the length of the channel, b is the width of the channel, and $H_{fuel-N2}$ is the thermodynamic distribution coefficient between fuel and sweep gas ($N_2$). The subscript m refers to the membrane while superscript s refers to sweep gas and f to the fuel. It is assumed that the concentration of oxygen in the sweep gas is negligible.

While, in prior art the flux of oxygen is proportional to the diffusivity of oxygen in the non-porous membrane ($D_m$).

$$j_{O_2}^{non-porous} = \frac{D_m}{L_m'}\left(\frac{C_{O2}^f}{H_{fuel-membrane}}\right)Zb. \quad (2)$$

Here, $L_m'$ is the thickness of the membrane, $H_{fuel-membrane}$ is the thermodynamic distribution coefficient between fuel and membrane. The potential improvement in deoxygenation performance, in a case when transport through the membrane is limiting is $$\frac{D_{O2}\varepsilon_m}{\tau L_m H_{fuel-N2}} \bigg/ \frac{D_m}{L_m' H_{fuel-membrane}} \sim 100. \quad (3)$$

Diffusion coefficient of oxygen in the membrane is more than 3 orders magnitude lower than that of the diffusion coefficient of oxygen in a sweep gas like $N_2$. The present invention, however utilizes the porous membrane with a thickness (FIG. 3) that is an order of magnitude greater than the heretofore utilized thin non-porous membrane. The ratio of the distribution coefficients $H_{fuel-N2}/H_{fuel-membrane}$ is typically less than 1, indicating an improvement in performance with the porous membrane 36 of the present invention.

Referring to FIG. 3, the membrane 36 includes a multiple of pores 42 (one shown). Two basic paths for Oxygen removal from the fuel are: 1) through the membrane 36 sweep gas interface; and 2) through fuel-sweep gas interface within a pore 42. Normally, the latter is the least resistance path.

In FIG. 3, P is the pressure. The subscripts s refers to sweep gas, f to the fuel, in to the flow inlet and out to the flow outlet. $C_{O2}$ is the Oxygen concentration in the fuel. $D_{O2}$ is the diffusion coefficient of oxygen in the sweep gas, L is the thickness of the channel/layer, Z is the length of the channel, b is the width of the channel, and H is the thermodynamic distribution coefficient.

Fuel is prevented from flowing through the pores 42 of the porous membrane 36 by maintaining a pressure differential across the membrane which is lower than the capillary force of the fuel Fc in a pore 42 of radius $r_p$. The pressure differential also provides a pressure on the sweep gas side which is lower than the pressure on the fuel side to prevent the sweep gas from bubbling through the pores 42 into the fuel.

$$0 \le \Delta P \le \frac{2\sigma \cos\theta}{r_p} \quad (4)$$

Figure 4:
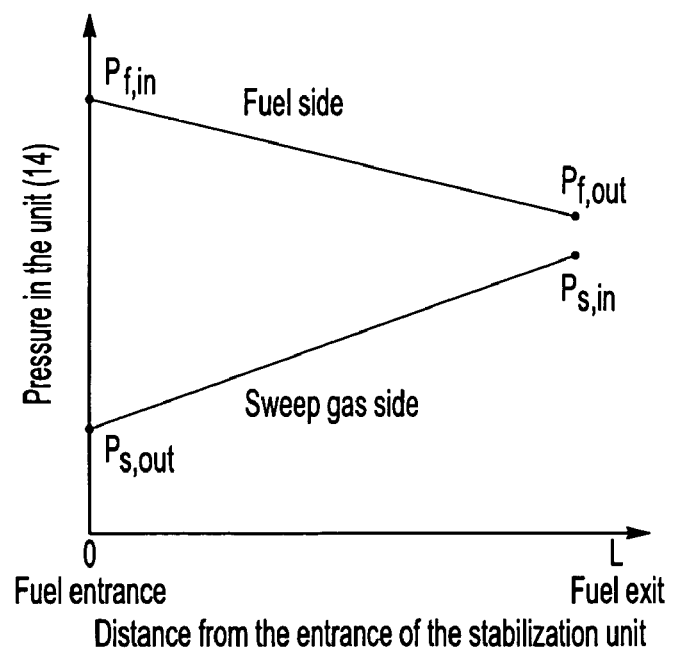
FIG. 4 is a graphical representation of pressure profiles along the length of the deoxygenator depicting the maximum pressure gradient across the membrane at the region of the fuel entrance.

In a counter flow configuration, the maximum pressure differential across the porous membrane 36 is at the entrance of the fuel (FIG. 4). Hence, ensuring that the fuel meniscus in the largest membrane pore 42 is in place at the entrance will ensure minimal leakage of the fuel into the sweep gas. Therefore, $$P_{f,in} - P_{s,out} \le \frac{2\sigma \cos\theta}{r_p} \quad (5)$$

At room temperature, the surface tension ca of kerosene is 25 dynes/cm or 0.025 $Nm^{-1}$. The contact angle θ is ~140° for JP-8 on Teflon AF-2400 membrane, and for a maximum pore radius of $r_p$ of 1 micron, a pressure differential of 10 kPa will prevent fuel from leaking to the sweep gas. In general, to achieve the benefits of improved performance, the contact angle between the fuel and the porous membrane is preferably non perpendicular. Most preferably, the contact angle θ is greater than 90°.

Figure 5:
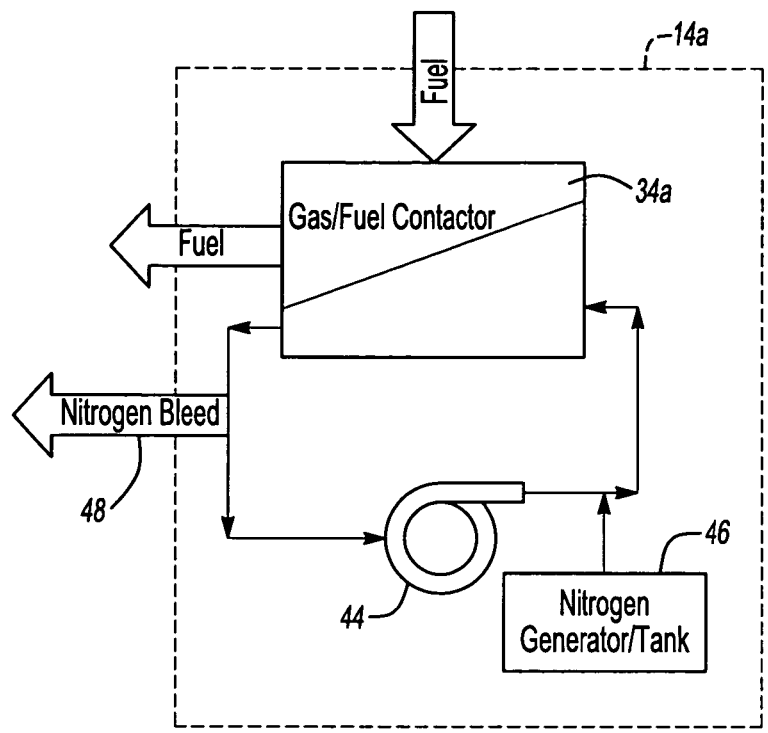
FIG. 5 is a block diagram of a deoxygenator system of the present invention.

Referring to FIG. 5, a deoxygenator system 14A includes a gas/fuel contractor 34A between a fuel circuit and a sweep gas circuit. The fuel flows co-current or counter-current to the sweep-gas. The sweep gas containing relatively higher amounts of oxygen after the gas/fuel contractor 34A is purged of oxygen through a recycle blower 44 and a purge system 48 such that pure nitrogen is added to the sweep gas circuit from a sweep gas reservoir 46 to maintain low concentrations of oxygen ($C_{O2}^s$) back into the gas/fuel contractor 34A. The driving force for oxygen across the membrane in this system is calculated by the following equation:

$$j_{O_2}^{porous} = \frac{D_{O2}\varepsilon_m}{\tau L_m}\left(\frac{C_{O2}^f}{H_{fuel-N2}} - C_{O2}^s\right)Zb \quad (6)$$

Figure 6:
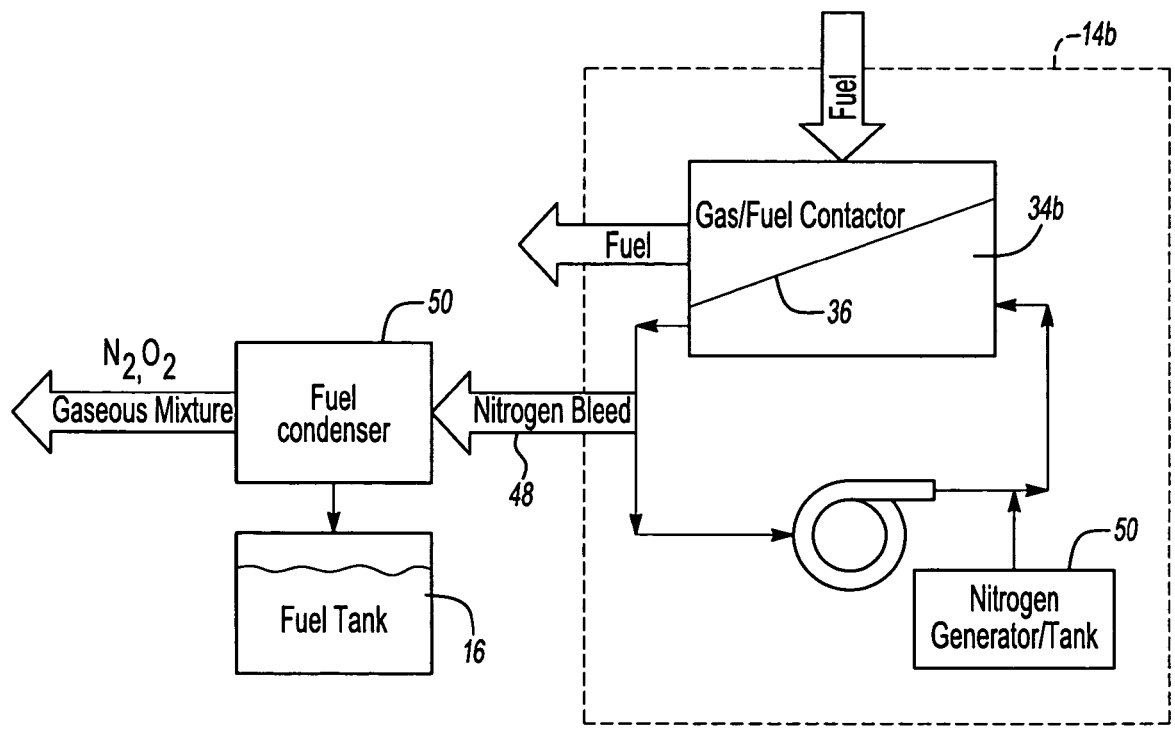
FIG. 6 is a block diagram of a deoxygenator system with a fuel condenser subsystem.

Referring to FIG. 6, a deoxygenator system 14B includes a gas/fuel contractor 34B between the fuel circuit and a sweep gas circuit. In some situations, the sweep gas may absorb fuel that leaks through the membrane 36. Hence, a nitrogen bleed 48 from the sweep gas circuit is condensed in a fuel condenser system 50 to separate the fuel from the gaseous mixture of sweep gas and oxygen. The condensed fuel from the condenser system 50 is then returned to the fuel reservoir 16, while the gaseous mixture is vented. Alternatively or additionally, the gaseous mixture from the fuel condenser system 50 is sent to the sweep gas reservoir 46.

Figure 7:
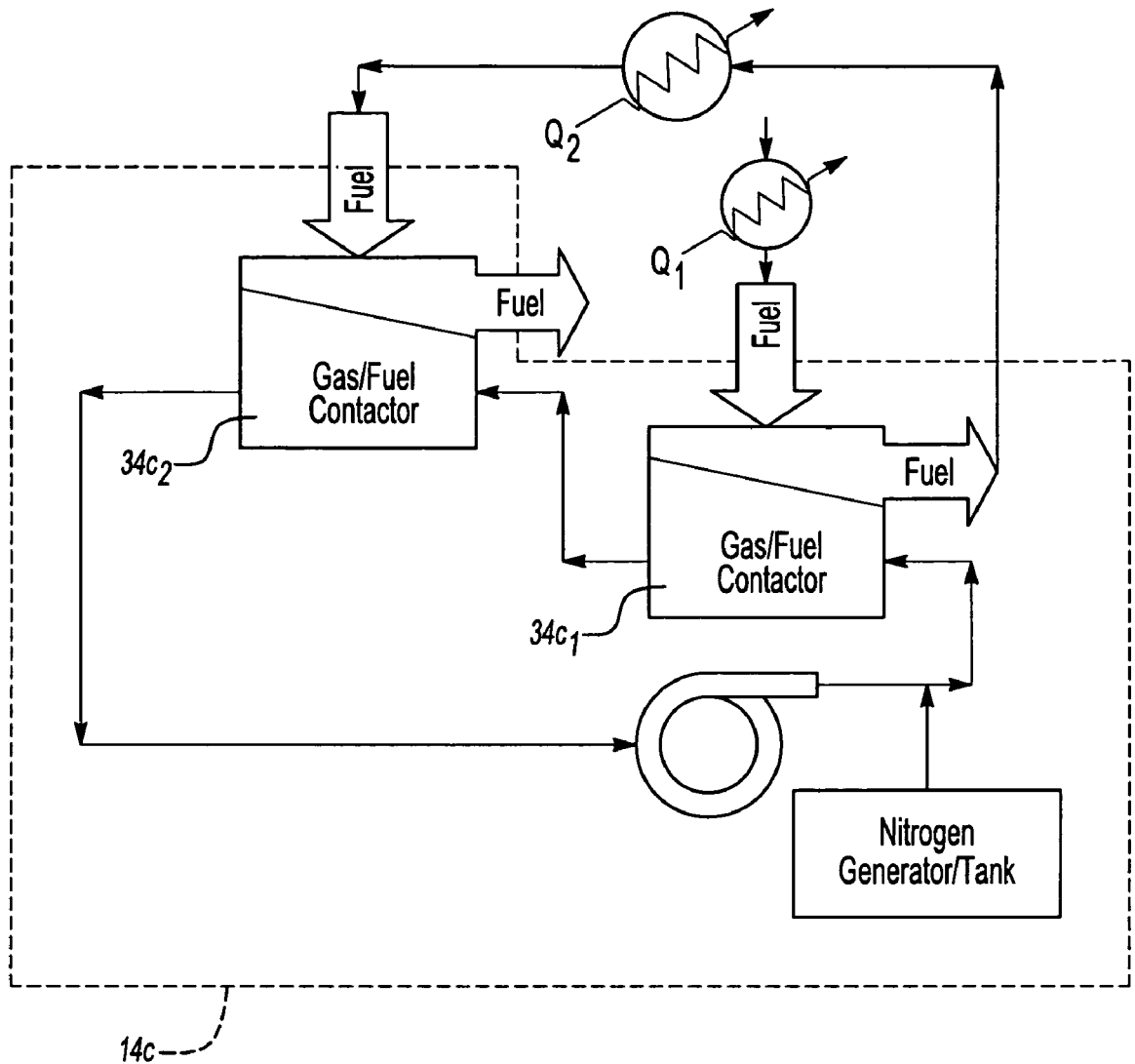
FIG. 7 is a block diagram of a staged deoxygenator system of the present invention.

Referring to FIG. 7, a deoxygenator system 14C includes a multiple of gas/fuel contractors 34C1, 34C2 . . . 34Cn between the fuel circuit and a sweep gas circuit. The gas-fuel contactors 34C1, 34C2 . . . 34Cn preferably operate at sequentially elevated fuel temperatures as the fuel is utilized as a coolant for a multiple of heat exchange sections Q1, Q2 . . . Qn such as fuel-oil heat exchange subsystems along the fuel circuit. Elevated fuel temperature facilitates oxygen removal by decreasing the solubility of oxygen (decreasing $H_{fuel-N2}$) in the fuel and increasing diffusion coefficient of oxygen in the fuel/membrane ($D_{O2}$, $D_m$), hence providing higher driving force for removal of oxygen and/or a lower volume system.

Elevated fuel temperatures directly translate to a decrease in the gas-fuel contactor volume, due to favorable thermodynamic effects which are generally proportional to the operating temperature of the fuel. Fuel heating at a multiple of heat exchange section Q1–Qn permits a multiple of in-series fuel-gas contactors 34C1, 34C2 . . . 34Cn to enable higher fuel heating, without coking, as the oxygen content in the fuel is decreased at the end of each stage. That is, although the fuel temperature is higher after being utilized to cool an earlier heat exchange section, the higher temperature fuel requires a smaller fuel gas contactor at the next stage to achieve generally equivalent oxygen reduction. The fuel is thereby progressively deoxygenated and increased in temperature as the fuel flows through the fuel system.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel system comprising:
a fuel channel;
an oxygen receiving channel; and
an oxygen permeable porous membrane in communication with said fuel channel and said oxygen receiving channel.

2. The fuel system as recited in claim 1, wherein said oxygen permeable porous membrane is generally parallel to said fuel channel and said oxygen receiving channel.

3. The fuel system as recited in claim 1, wherein said oxygen permeable porous membrane is non-perpendicular to said fuel channel.

4. The fuel system as recited in claim 1, wherein said oxygen receiving channel communicates an inert gas therethrough.

5. The fuel system as recited in claim 1, wherein said fuel channel communicates a liquid fuel containing a dissolved oxygen therethrough, said oxygen permeable porous membrane operable to separate the dissolved oxygen from the fuel.

6. The fuel system as recited in claim 1, wherein said oxygen permeable porous membrane is unsupported.

7. The fuel system as recited in claim 1, wherein said fuel channel communicates a liquid fuel in a first direction and said oxygen receiving channel communicates a gas in a direction opposite the first direction.

8. The fuel system as recited in claim 1, further comprising a pressure differential across said oxygen permeable porous membrane, said pressure differential lower than a capillary force of the fuel within a pore of said oxygen permeable porous membrane.

9. The fuel system as recited in claim 1, wherein said oxygen receiving channel comprises a sweep gas.

10. The fuel system as recited in claim 1, wherein said oxygen receiving channel comprises a vacuum.

11. The fuel system as recited in claim 1, wherein said oxygen receiving channel maintains a pressure differential across the oxygen permeable porous membrane, the pressure differential lower than a capillary force of a fuel within a pore of the oxygen permeable porous membrane.

12. The fuel system as recited in claim 1, wherein a pressure differential defined across the oxygen permeable porous membrane provides a pressure within the oxygen receiving channel lower than a pressure within the fuel channel.

13. A fuel system comprising:
a fuel channel;
an oxygen receiving channel; and
a gas/fuel contactor in communication with said fuel channel and said oxygen receiving channel.

14. The fuel system as recited in claim 13 further comprising a fuel condenser in communication with said oxygen receiving channel.

15. The fuel system as recited in claim 13, further comprising a sweep gas reservoir in communication with said oxygen receiving channel.

16. The fuel system as recited in claim 13, further comprising a second gas/fuel contactor in communication with said fuel channel and said oxygen receiving channel, said second gas/fuel contactor in series with said gas fuel contactor.

17. The fuel system as recited in claim 16, wherein said second gas/fuel contactor receives fuel at a fuel temperature greater than a fuel temperature of said gas/fuel contactor.

18. The fuel system as recited in claim 13, wherein said gas/fuel contactor comprises an unsupported oxygen permeable porous membrane in communication with said fuel channel and said oxygen receiving channel.

19. A method of minimizing dissolved oxygen from within a fuel system comprising the steps of:
(1) locating an oxygen permeable porous membrane adjacent a liquid fuel flow containing a dissolved oxygen; and
(2) flowing a sweep gas along the oxygen permeable porous membrane to draw the oxygen through the oxygen permeable porous membrane.

20. A method as recited in claim 19, wherein said step (2) further comprises the steps of:
flowing the gas in a direction opposite a direction of the liquid fuel flow.

21. A method as recited in claim 19, wherein said step (1) further comprises
locating the oxygen permeable porous membrane non-perpendicular to said fuel flow.

22. A method as recited in claim 19, further comprising the steps of:
maintaining a pressure differential across the oxygen permeable porous membrane, the pressure differential lower than a capillary force of the fuel within a pore of the oxygen permeable porous membrane.

23. A method as recited in claim 19, further comprising the steps of:
maintaining a pressure differential across the oxygen permeable porous membrane, the pressure differential comprising a pressure on the sweep gas side lower than a pressure on the fuel side.

24. A method as recited in claim 19, further comprising the steps of:
communicating the sweep gas to a fuel condenser downstream of the oxygen permeable porous membrane; and
condensing the fuel from within the sweep gas.

* * * * *